Jan. 26, 1960 M. B. RASMUSSON 2,922,547
CONFECTION DISPENSER
Filed Oct. 22, 1957 3 Sheets-Sheet 1
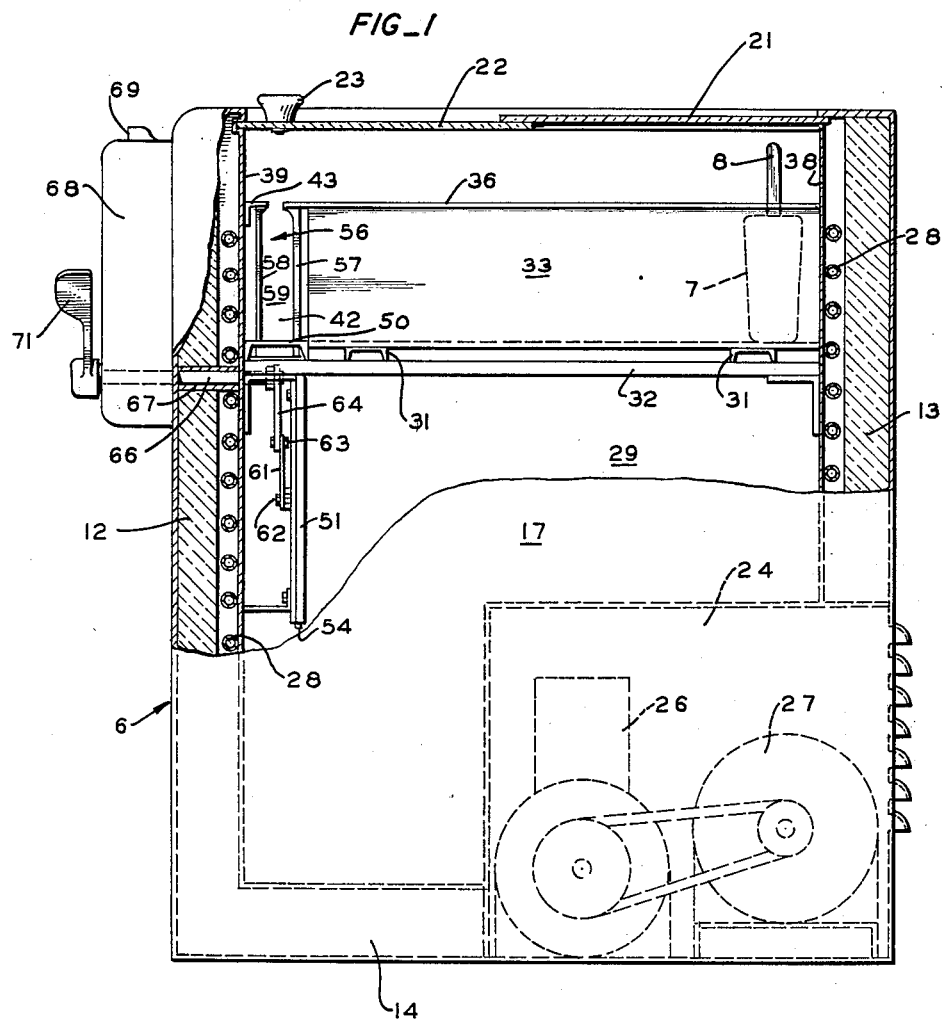
FIG_1
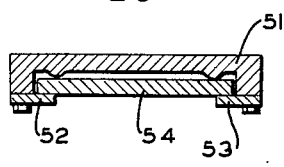
FIG_5
INVENTOR.
MARLIN B. RASMUSSON
BY Lothrop & West
ATTORNEYS

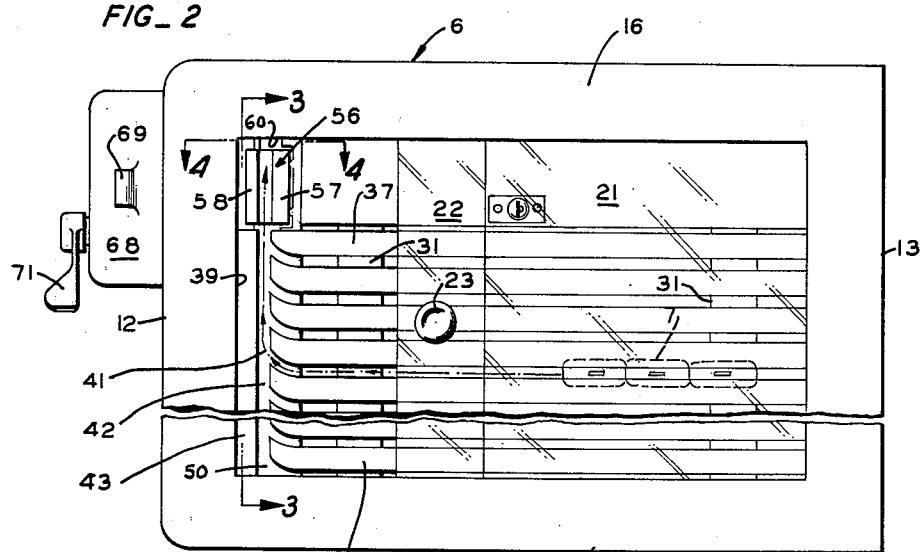
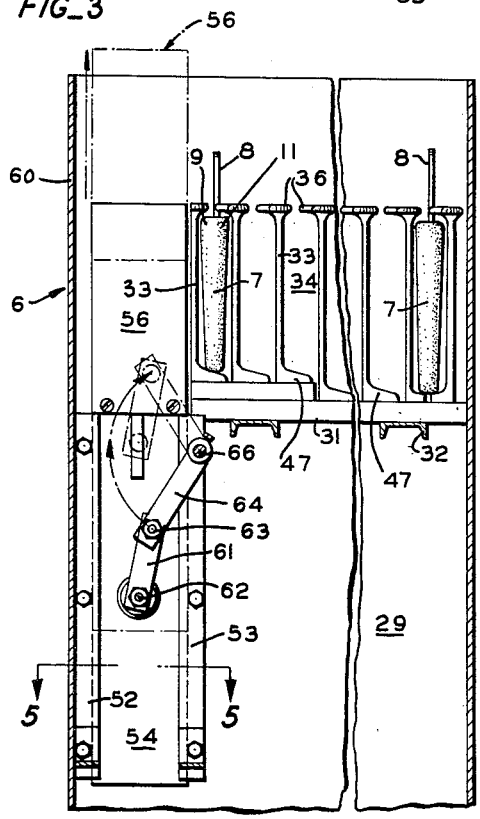
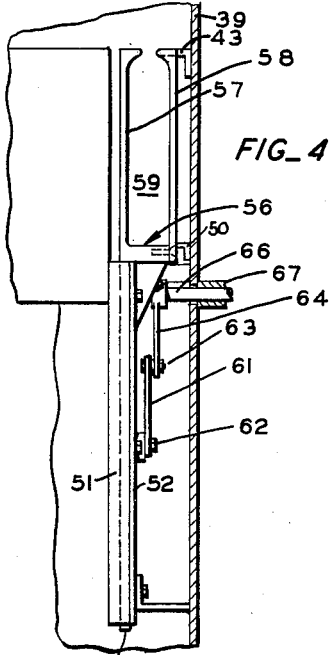

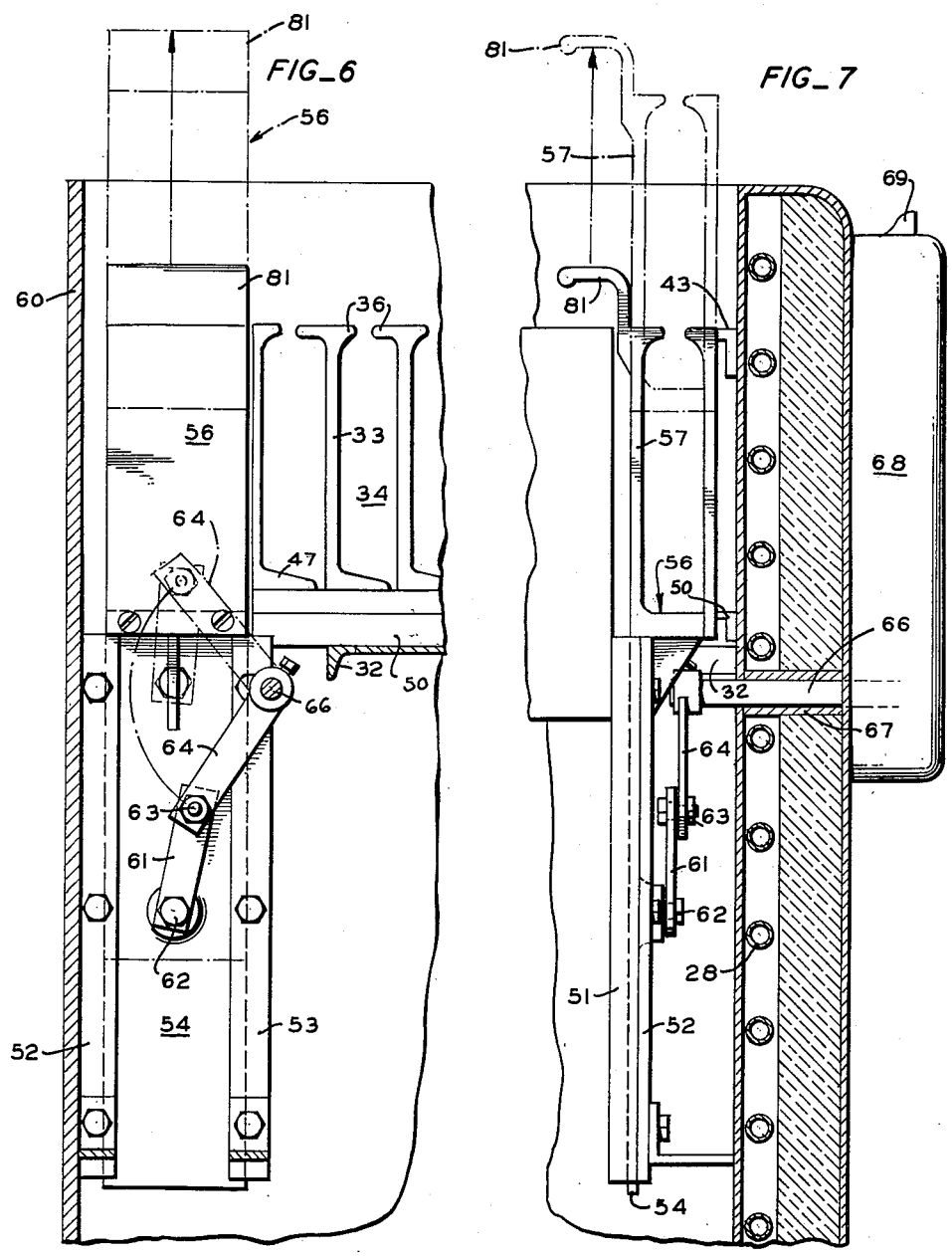

2,922,547

CONFECTION DISPENSER

Marlin B. Rasmusson, Sacramento, Calif.

Application October 22, 1957, Serial No. 691,734

1 Claim. (Cl. 221—133)

My invention relates to devices for the orderly maintenance and withdrawal of confections, particularly frozen confections of the sort including a block of ice cream or other frozen material from which a stick or handle projects. Devices of this nature are primarily for installation in public places so that an individual can, upon the deposit of a coin, extract from the dispenser a single unit of the confection.

An object of the invention is to provide a dispenser of extremely simple and reliable mechanism so that it can be left unattended for protracted periods and can be readily actuated by prospective purchasers, especially juveniles.

Another object of the invention is to provide a confection dispenser which will maintain the product, particularly a frozen product, in satisfactory condition for an extended period.

A still further object of the invention is to provide a confection dispenser in which but a single unit of product can be released at one time.

A still further object of the invention is to provide a confection dispenser that is readily cleaned and maintained in a sanitary condition.

Another object of the invention is to provide a confection dispenser in which a choice of different units to be dispensed can readily be afforded.

A still further object of the invention is in general to improve confection dispensers.

Other objects, together with the foregoing, are attained in the embodiments of the invention described in the accompanying drawings in which:

Figure 1 is a side elevation of a confection dispenser pursuant to the invention, portions of the side walls of the mechanism being broken away to disclose much of the interior construction in vertical longitudinal cross-section.

Figure 2 is a plan of the structure shown in Figure 1, a portion being removed to reduce the size of the figure.

Figure 3 is a cross-section the plane of which is indicated by the line 3—3 of Figure 2, certain portions being broken away to reduce the size of the figure.

Figure 4 is a detailed cross-section the plane of which is indicated by the line 4—4 of Figure 2.

Figure 5 is a cross-section the plane of which is indicated by the line 5—5 of Figure 3.

Figure 6 is a view comparable to Figure 3, but showing a modified form of the structure.

Figure 7 is a view comparable to Figure 4, but showing the modified form of structure of Figure 6.

While the confection dispenser in accordance with the invention can be embodied in a number of different forms it has successfully been commercially constructed as shown herein. In the first form of the device there is provided a cabinet generally designated 6. This is designed to be of a size and configuration for ready installation in public places and to receive a charge of articles to be dispensed of appropriate number to make servicing feasible. The units for dispensing chosen for illustration herein are frozen confections on a stick. Each of these includes a block 7 of frozen material, such as ice cream or water ice, approximately rectangular and having an end face from which projects a relatively thin or small wooden stick 8. The confection is illustrated in exemplary form in Figures 1, 2, and 3. The relationship of the block and stick is such that there are relatively wide shoulders 9 and 11 at the upper, or stick end of the confection.

Since the confections must be maintained at a relatively low temperature for best condition the cabinet 6 is provided with a front wall 12 and a rear wall 13 lined with insulating material. Likewise, the bottom wall 14 and the side walls 16 and 17 are similarly insulated. The top is provided with a stationary rearward, transparent closure 21 and a slidable forward, transparent closure 22 having an operating handle 23 thereon. The contents of the cabinet are normally enclosed but they can be readily inspected through the transparent top panels 21 and 22 and access to the interior can be had by sliding the panel 22 rearwardly underneath the panel 21.

To maintain the desired temperature within the cabinet 6 a portion of it is segregated to afford a machine compartment 24 within which a refrigerator mechanism 26 is disposed. This is actuated by a motor 27 and is a standard unit not otherwise necessary to describe. The refrigerator mechanism 26 is connected to a cooling coil 28 the convolutions of which are suitably disposed around the interior of the cabinet within the insulated walls thereof. The lower portion 29 of the cabinet not occupied by the machinery compartment 24 is utilized as a storage space for confections subsequently to be dispensed.

The upper part of the cabinet is spanned by a number of frame members 31 fastened on support bars 32 secured to the side walls of the cabinet so as to afford an appropriate supporting framework. Resting on the frame members 31 are specially formed bars 33 all of which are parallel to each other and each of which has a special configuration. This configuration is such that (as especially seen in Figure 3) elongated lateral or storage channels 34 are afforded between adjacent bars. These channels are of a size and configuration freely to accept the frozen block portion 7 of the confections, but the channels are narrowed at the top by flanges 36 projecting from either side of the adjacent bars to provide a pathway, called a "storage" pathway, only large enough to accept the projecting sticks 8 and to prevent withdrawal therethrough of the shoulder portions 9 and 11 of the confections 7.

The bars 33 extend forwardly from the rear interior wall 38 of the cabinet but stop short of the forward, interior wall 39 thereof. At their forward ends the various bars 33 are curved to define a path as shown by the broken line 41 and all the storage channels 34 merge with an elongated transverse main or dispensing channel 42 in part formed between the forward ends of the bars 33 and a transverse bar 43 extending nearly all the way across the front portion of the cabinet. The front bar 43 and the tops of the forward ends of the bars 33 are contoured so that they define an elongated dispensing pathway intersecting the similar storage pathways between the parallel bars 33. The channel 42 is thus narrowed at the top so that it passes only the stick 8 of a confection. Some of the various bars 33 and 43 are of slightly different configurations in order to accommodate confections of different depths and different shapes, although the variations in shape of confections now commercially available are not great. In all cases, however, the confections are supported from below by resting upon bottom flanges 47 projecting from the individual bars 33 or upon a transverse support 50 (Figure 1) level with the flanges 47 and disposed at the bottom of the channel 42 beneath the front bar 43. The member 50 has been omitted, however, from Figure 3 to show more clearly the shapes of the bars 33 and their supporting means.

Adjacent one end of the main or dispensing channel 42 there is provided an elevator mechanism. Forming part of the frame work is a guide 51 (Figures 3-5) having confining straps 52 and 53 removably secured thereto. Vertically reciprocable within the confines of the guide is an elevator slide 54. This is primarily a plate at its upper end carrying an elevator cage 56. The cage is rigidly secured to the plate 54 and includes a back wall 57 and a front wall 58. The configuration in cross-section of the compartment 59 within the cage is substantially the same as that of the main channel 42. The position of the parts is such, in one instance, that the elevator compartment 59 is in direct alignment with the end of the end bar 33, the bar 43 and the support 50 forming the main channel 42 so that the compartment 59 is, in effect, a continuation of the main dispensing channel 42. While the elevator cage 56 is laterally open so that free communication is had with the main channel 42, it is situated very close to the side wall 60 of the cabinet so that there is no ingress or egress from that side of the elevator cage, at least in the full line position shown in Figure 3.

In order to control the motion of the elevator, it is provided with a link 61 at one end secured to the plate 54 by a pivot pin 62. The link is also connected by a pivot pin 63 to a crank 64 mounted at the end of an actuating shaft 66. This shaft is journalled in a bearing 67 within the cabinet frame. It is mechanically connected to a coin control unit 68 of a standard commercial sort not described in detail except to point out that it has a coin entrance slot 69, and is mechanically connected to the shaft 66 in such a way that the shaft cannot be turned unless a coin has first been inserted through the slot 69 into the mechanism 68. The shaft can be turned just once in one direction for each coin inserted in the mechanism 68 by actuation of a lever 71 disposed in a convenient location on the forward end of the shaft 66.

In the operation of this structure, assuming that the cabinet has been in operation for some time and that its temperature is therefore satisfactory and that the various lateral channels 34 are stocked with confections of different sorts, a prospective user inspects the supply of confections through the transparent top panels 21 and 22. He then places a coin in the slot 69 to actuate the mechanism within the coin box 68 so that the level 71 is freed for operation for one cycle.

Prior to actuating the lever, the user pushes back the slide 22 and grasps the upwardly projecting stick of the foremost frozen confection in any one of the lateral channels 34, thus selecting the confection of his choice. He manually moves such confection, while grasping the stick, out of its lateral channel 34 and turns it into the main channel 42. He continues to move it along the main channel until the confection is lodged within the compartment 59 in the elevator cage 56. The confection cannot be extracted from the machine up to this point.

The user then actuates the freed lever 71 in such a way as to lift the elevator slide 54. This simultaneously lifts the elevator cage 56 through the dotted line position shown in Figures 3, 6 and 7 to a higher location and lifts the confection up high enough so that it can be laterally extracted from the elevator cage either above the adjacent tops of the bars 36 or in the other direction out of the cabinet entirely. It is usual to have the elevator stop before it rises clear above the cabinet and to require extraction of the chosen confection by movement thereof above the various lateral bars.

Having extracted his confection, the user is prevented from getting another one because the raised position of the elevator blocks any further egress from the cross main channel 42. The user then releases the handle which returns by gravity to its initial position. This then restores the machine to position for further operation. When the coin mechanism 68 is freed by insertion of a subsequent coin, this can be accomplished.

In the form of the device shown in Figures 6 and 7, the mechanism is substantially identical to that previously described with only a few exceptions. In this instance the exterior handle 71 is omitted. It is replaced by a finger hook 81 projecting from the wall 57 of the elevator cage 56. The operation is just as described except that in order to raise and lower the elevator the user does not manipulate any handle 71 but simply grasps the hook 81 and directly lifts (and lowers) the elevator. The elevator motion is accompanied by motion of the shaft 66, just as before, so that the interrelationship of the coin control mechanism 68 and the operation of the confection dispenser is maintained. In the Figure 1 modification the force for raising the elevator is transmitted from the handle 71 through the shaft 66 to the elevator whereas in the Figure 6 arrangement the force is transmitted from the elevator through the shaft 66 to the coin control mechanism 68.

In both forms of device there is provided a compact, simple, confection dispenser especially designed for dispensing frozen confections and one which can be operated by people of little skill and yet which displays a variety of products and affords a choice of items to be dispensed. The mechanism is in good heat transfer relationship with the refrigeration mechanism since the bars 33, 43 and the support 50 are of good heat conducting metal and the arrangement is generally such that a high degree of sanitation can readily be maintained. The confection dispenser, in either form, provides an improvement in the art.

What is claimed is:

A confection dispenser comprising a cabinet including a frame, means on said frame within said cabinet defining a plurality of elongated storage channels having longitudinally extending storage pathways at the top, each of said storage channels and pathways being defined by horizontal bars at the bottom, on the sides and at the top on either side of said storage pathway to make the storage pathway narrower than said storage channel, means on said frame within said housing defining an elongated dispensing channel having a longitudinally extending dispensing pathway at the top, said dispensing channel merging with said storage channels and said dispensing pathway intersecting said storage pathways, said dispensing channel and pathway being open at one end and being defined by wall structure on the bottom, on one side and at the top on one side of said dispensing pathway and being defined by the ends of said bars on the other side and at the top on the other side of said dispensing pathway to make the dispensing pathway narrower than said dispensing channel, an elevator on said frame within said cabinet and extending vertically across said one end of said dispensing channel and said dispensing pathway, a rigid cage on said elevator open at least on one end and having in transverse cross-section a shape substantially the same as the shape in transverse cross-section of said dispensing channel and pathway, and manually operable means on said frame for vertically moving said elevator between a lower position in which said cage forms substantially a longitudinal continuation of said dispensing channel and pathway and an upper position in which said cage is disposed above and in blocking position with respect to said dispensing channel and said dispensing pathway.

References Cited in the file of this patent
UNITED STATES PATENTS

| | | |
|---|---|---|
| 1,666,575 | Lee | Apr. 17, 1928 |
| 2,114,246 | Baker et al. | Apr. 12, 1938 |
| 2,604,966 | Smith | July 29, 1952 |
| 2,637,612 | Warner et al. | May 5, 1953 |
| 2,765,103 | Foushee | Oct. 2, 1956 |